(12) United States Patent
Singh et al.

(10) Patent No.: US 12,260,430 B2
(45) Date of Patent: Mar. 25, 2025

(54) CONTEXTUAL RECOMMENDATION OF PROMOTIONS AND ADVERTISING

(71) Applicant: Cerence Operating Company, Burlington, MA (US)

(72) Inventors: Kuldeep Singh, Aachen (DE); Reimund Schmald, Aachen (DE); Johan Wouters, Aachen (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 18/109,967

(22) Filed: Feb. 15, 2023

(65) Prior Publication Data

US 2024/0273574 A1    Aug. 15, 2024

(51) Int. Cl.
*G06Q 30/00* (2023.01)
*G06Q 30/0251* (2023.01)

(52) U.S. Cl.
CPC ................... *G06Q 30/0266* (2013.01)

(58) Field of Classification Search
CPC .................................. G06Q 30/0266
See application file for complete search history.

(56) References Cited

U.S. PATENT DOCUMENTS 11,468,476 B1 * 10/2022 Lundsgaard ............ H04L 65/61
11,526,909 B1 * 12/2022 Clepper ............... G06V 20/593
2014/0257989 A1 * 9/2014 Prakah-Asante .. G01C 21/3484
    705/14.63
2015/0206181 A1 * 7/2015 Parundekar ........ G06Q 30/0261
    705/14.49
2016/0098412 A1 * 4/2016 Davidsson ......... G01C 21/3407
    707/770
2019/0171408 A1 * 6/2019 Inaba ..................... G06F 40/258
2020/0058053 A1 * 2/2020 Seko .................. G06Q 30/0259
2021/0312500 A1 * 10/2021 Krishnamurthy .. G06Q 30/0255
2023/0252527 A1 * 8/2023 Verma ................ G06Q 30/0271
    705/14.68

* cited by examiner

*Primary Examiner* — Meredith A Long
(74) *Attorney, Agent, or Firm* — Occhiuti & Rohlicek LLP

(57) ABSTRACT

A method that includes receiving information indicative of a location of a vehicle. The vehicle has an occupied-vehicle state that includes an occupant state. This occupant state represents the state of one or more occupants within the vehicle. The method further includes receiving information indicative of this occupant state. The information indicative of the occupant state results from an observation by a detector that is in communication with an infotainment system within the vehicle. The method continues with using both the information indicative of the occupant state and the information indicative of the location to select an advertisement from a database of advertisements. This selected advertisement is one that is ultimately for presentation to the occupant.

13 Claims, 3 Drawing Sheets

CONTEXTUAL RECOMMENDATION OF PROMOTIONS AND ADVERTISING

BACKGROUND

Through the use of a GPS system, it has become possible for a vehicle's occupant to provide a destination to the GPS system, which then guides the occupant to that destination. This is particularly useful for those who use a vehicle to travel to unfamiliar surroundings.

However, sometimes an occupant in unfamiliar territory can find it difficult to know what to enter as a destination. For instance, if one wants to find a purveyor of particular goods or services in an unfamiliar setting, it may be difficult to know what destination to choose.

Providers of GPS services have addressed this difficulty by providing databases that allow various businesses to be shown on a map. An occupant can then search for a particular class of goods or service and find the closest purveyor.

Those who engage in commercial activity often find it necessary to promote their goods and services. Such promotions typically include advertisements and various promotion offers. Examples of promotion offers are messages that announce an opportunity to engage in a commercial transaction under particularly favorable terms during a time interval, within a spatial region, or both.

SUMMARY

A difficulty that arises is that a vehicle occupant in an unfamiliar location may not know the full scope of available promotions within the area. Thus, a vehicle occupant in an unfamiliar city may be able to find a fast-food restaurant nearby. But such a vehicle occupant may not know that a different fast-food restaurant, which is only slightly further, is offering a particularly good deal on, for example, French fries.

A system and a method that is described herein alleviates this difficulty and many others.

In one aspect, such a method includes receiving information indicative of a location of a vehicle. The vehicle has an occupied-vehicle state that includes an occupant state. This occupant state represents the state of one or more occupants within the vehicle. The method further includes receiving information indicative of this occupant state. The information indicative of the occupant state results from an observation by a detector that is in communication with an infotainment system within the vehicle. The method continues with using both the information indicative of the occupant state and the information indicative of the location to select an advertisement from a database of advertisements. This selected advertisement is one that is ultimately for presentation to the occupant.

Examples of information indicative of occupant state include information about one or more occupants of the vehicle, such as age, gender, emotional state.

Among the practices of the method include those in which the advertisement identifies a prospective transaction for the occupant to engage in. This prospective transaction is one that is only available to the occupant while the occupant is within a finite spatial region and only during a temporal interval. In such practices, selecting the advertisement comprises determining that the occupant will be able to reach the spatial region before the end of this temporal interval. For example, if a promotion is at a commercial establishment that is too far away, the vehicle may not make it there before the it closes.

Other practices make use of a vehicle state in addition to the occupant state. Such practices include receiving information indicative of this vehicle state. In such cases, selecting the advertisement includes using the vehicle state in addition to the location and the occupant state to select the advertisement.

In some cases, the occupant state varies over time. Further practices of the method accommodate this by receiving information indicative of a change in the occupant state and using that information when selecting the advertisement.

Still other practices include those in which information indicative of the occupant state comprises information derived from speech that comes from the occupant, those in which information indicative of the occupant state comprises information derived from conversation between various occupants of the vehicle, those in which information indicative of the occupant state comprises information derived from activity by the occupant, those in which the information indicative of the occupant state comprises information derived from interaction between the occupants, and those in which the information indicative of the occupant state comprises information indicating that the occupant has been exposed to a particular media item.

Still other practices include those in which selecting the advertisement comprises selecting an advertisement for a product advertised by a media item to which the occupant has been exposed while in the vehicle.

Among the practices of the method are those in which the information indicative of the occupant state comprises information indicating how many occupants are in the vehicle as well as information concerning any demographic features of the one or more occupants in the vehicle.

In some embodiments, external context information is also relied upon to select an advertisement. Examples of external context information include ongoing activities, promotional offers, vehicle location, traffic, media being played, for example particular advertisements on the radio.

In some practices, a vehicle occupant initiates an interaction with the infotainment system by asking about available offers. A voice assistant retrieves data to identify one or more relevant offers and communicates them to the vehicle occupant. In some cases, the voice assistant invites a spoken response. In response to an occupant's indication of interest in an offer, the voice assistant transmits information concerning the offer to a personalized wallet associated with the vehicle occupant. In some practices, the voice assistant also reminds the vehicle occupant to use the offer before its expiration.

Other practices include offers whose relevance depends on vehicle location. In such practices, an occupant's presence in a particular geographic area triggers the voice assistant to retrieve data concerning offers relevant to that area. Practices include those in which the occupant's entry into the area triggers to voice assistant. In other practices, the occupant's act of parking that area triggers the voice assistant.

In some of the foregoing practices, the voice assistant responds to an occupant's spoken expression of interest in a particular offer by providing further details of the offer. In other practices, the voice assistant shares further details of the offer. In other practices, the voice assistant responds to an occupant's spoken expression of interest in a particular offer by automatically navigating to a location at which the offer can be accepted.

Some practices feature the use of a cabin monitoring system to extract information indicative of occupant state to use as context for selecting particular offers to be communicated to the vehicle occupant. Examples of information detected by a cabin monitoring system for extraction of context include one or more characteristics of the vehicle population, such as the number of people in the vehicle, their age, sex, or other demographic information that is used for targeting advertisements. Other examples include emotional states of the population, including an average emotional state.

Other characteristics that can be used for selection of an advertisement include the vehicle's destination, location, and velocity, including magnitude and direction thereof. These are typically available from on-board instrumentation, including such devices as a GPS unit, a speedometer, an inertial navigation device, a gyroscope, and a compass. Also available for use as context for selecting an advertisement is a state of the vehicle's environment. Examples include the weather, time of day, amount of daylight remaining, and any special events occurring or scheduled to occur in the vehicle's vicinity.

In one example, the geo-promotion system has determined that a person is driving the vehicle at around noon on a highway heading towards a particular city but still at some distance from the city. The geo-promotion system learns that traffic is light and that an advertisement for a particular beer has recently played on the vehicle's radio. Recognizing that the day is hot and humid and anticipating the occupant's need for refreshment, the geo-promotion system retrieves an offer for the beer being advertised and identifies a location at the destination where the offer may be accepted. The geo-promotion system then serves the advertisement. Upon detecting the occupant's interest in the offer, the geo-promotion system offers to transmit a relevant promotion to the occupant's mobile device and to navigate to the location of the beer festival.

A system and method along the lines of the foregoing provides a vehicle occupant with unique local offers and, upon acceptance of an offer, the pleasure of obtaining a discount at a location that the vehicle occupant might not have otherwise known about. This promotes serendipitous discovery.

The system and method make the experience of finding and accepting an offer relatively painless. The experience requires only a matter of seconds of the occupant's attention and eliminates the need for a vehicle occupant to keep track of when offers are available, when they expire, where they are valid, blackout periods, and other burdensome tasks that might otherwise discourage the vehicle occupant from even looking for promotional offers.

Since many vehicle occupants do not like to be bombarded with a constant stream of offers, particular practices feature adjustable offer frequencies or restrictions on the nature of the offers. This avoids irrelevant offers such as an offer for a discount at a steak house being made to a vehicle occupant whose stored profile provides information indicative of being a vegetarian.

In some practices, the offers are relevant to the vehicle itself. For example, upon detecting that the vehicle's mileage is approaching time for an oil change, the voice assistant provides the vehicle occupant with information concerning garages where oil changes are performed at a discount. Upon detecting that a vehicle occupant is using an infotainment system in a particular way, the voice assistant may provide the vehicle occupant with information on a vehicle software upgrade that would make such use substantially easier.

In another aspect, the invention features a geo-promotion system for selecting an advertisement for delivery to a vehicle's occupant. Such a system includes an automotive assistant that uses a speech interface on a vehicle's infotainment system. The system includes an advertisement manager that uses prepared context information to select an advertisement from a database of advertisements. Context logic receives context information concerning the vehicle and generates prepared context information for the advertisement manager. The prepared context information includes location of the vehicle and information obtained from speech that occurred within the vehicle.

In another aspect, the invention features a geo-promotion system for selecting an advertisement for delivery to an occupant in a vehicle having an infotainment system. The system does so based at least in part on a location of the vehicle and on context information derived from occupant state. At least some of this context information is obtained from speech that occurs within the vehicle. The geo-promotion system includes an automotive assistant, a database of advertisements, context logic, and an advertising manager. The automotive assistant, which executes on the infotainment system, is one that is configured to use a speech interface that is connected to a microphone and to a loudspeaker, both of which are in the vehicle. This permits the automotive assistant to engage in speech communication with the occupant. The database includes advertisements that were compiled from a source of advertisements. The advertisement manager, which is in data communication with the database, has been configured to use prepared context information to select an advertisement from the database for presentation to the occupant. Finally, the context logic receives context information concerning the vehicle and generates the prepared context information for use by the advertisement manager in selecting the advertisement. This prepared context information includes both location of the vehicle and information obtained from speech that occurred within the vehicle.

Further embodiments include those in which the geo-promotion system further includes a presentation manager. Embodiments that include such a presentation manager include those in which the presentation manager receives a selected advertisement from the advertisement manager and, based on context, delays presentation of the advertisement.

Also among the embodiments are those in which the presentation manager receives context information indicating that the vehicle also includes a display, in which case the presentation manager causes an advertisement selected by the advertisement manager to be presented using both the loudspeaker and the display.

In still other embodiments, the presentation manager, in response to receiving context information indicating that the vehicle lacks a display, causes content from the advertisement to be provided to the occupant only through the loudspeaker.

Other embodiments include a context aggregator in data communication with the context logic, with the advertisement manager, and with a vehicle-data server. The context aggregator collects sensor data obtained from sensors in the vehicle and interrogates the vehicle-data server for the sensor data in response to a request from the context logic. It then receives data from the vehicle-data server and communicates both the data from the vehicle-data server and the context received from the context logic to the advertisement manager.

In still other embodiments, the geo-promotion system further includes a dialog manager that is in data communication with the speech interface and with the context logic for providing context that originates from speech and that receives information from the presentation manager for presentation to the occupant via the speech interface.

In other embodiments, the advertisement manager includes a semantic analyzer that carries out semantic analysis of the context to identify a question posed by the occupant and an answer selector that relies on deep learning to formulate an answer that is consistent with the semantic analysis.

A variety of context sources are available to the context logic. Embodiments include those in which the context logic receives camera data from a camera in the vehicle and extracts context from the camera data, those in which it receives emotion data from an emotion classifier in the vehicle and to extract context from that emotion data. These all amount to information indicative of occupant state. Also among the context sources are sources that receive external data from an external sensor on the vehicle. This external data can also be used to extract context.

Still other embodiments of the geo-promotion system further include a notification module that prioritizes the advertisement selected by the advertising manager. Among these are embodiments in which the notification module does so by using an occupant's stored preferences and the occupant's topic of inquiry. Embodiments further include those in which the notification module delivers content from the advertisement using a mode whose intrusiveness depends on the priority, wherein the modes comprise a speech announcement for urgent priority, a visual cue for a less urgent priority.

In another aspect, the invention features using a geo-promotion system to select an advertisement for delivery to an occupant in a vehicle based at least in part on a location of the vehicle and on context information derived from occupant state. Such a vehicle includes an infotainment system that is executing an automotive assistant that has been configured to use a speech interface that is connected to a microphone and to a loudspeaker, both of which are in the vehicle, to permit the automotive assistant to engage in speech communication with the occupant. A method for using such a geo-promotion system includes receiving information indicative of a location of a vehicle, receiving information indicative of occupant state, accessing a database that stores advertisements, based on the location of the vehicle and the information indicative of occupant state, selecting an advertisement from the database, and causing content of the advertisement to be presented to the occupant.

Among the practices of the foregoing method include those in which using the geo-promotion system includes causing the geo-promotion system to transition from a first operating mode to a second operating mode, receiving the selected advertisement, causing the geo-promotion system to transition from the second operating mode back to the first operating mode, and receiving another selected advertisement. Among these are embodiments in which the first mode is a passive mode and the second mode is a proactive mode. Also, among the embodiments are those in which the first mode is the proactive mode and the second mode is the passive mode.

Still other practices include those in which using the geo-promotion system includes receiving speech from the occupant, interpreting the speech as being indicative of a request for an advertisement and using the speech as context for selecting the advertisement.

Also among the practices are those in which using the geo-promotion system includes monitoring speech within a cabin of the vehicle. This speech provides information indicative of occupant state. The method continues with extracting, from the monitored speech, context for use in selecting the advertisement, and providing the context to the advertising manager for use in selecting the advertisement from the database.

Other practices include those in which using the geo-promotion system includes receiving data from a vehicle-data server that receives vehicle-sensor data from a plurality of vehicles and using context information derived from the vehicle-sensor data when selecting the advertisement.

Still other practices of using the geo-promotion system include receiving population information indicative of a number of persons within the vehicle and using the population information when selecting an advertisement and/or receiving demographic information for one or more persons within the vehicle and using the demographic information when selecting an advertisement.

The scope of the claims is hereby limited to non-abstract implementations. To ensure that this is the case, a description of any abstract implementations has been omitted. Acting as his own lexicographer, Applicant hereby defines "non-abstract" as the converse of "abstract" as that term has been defined by the Federal Circuit and the Supreme Court of the United States as of the filing date of this application. Accordingly, any person who construes the claims as covering abstract subject matter would merely be proving that it is possible to misconstrue the claims by failing to consider them in light of the specification.

The apparatus recited in the claim comprises tangible physical matter and consumes energy. Experimental evidence thus far has established that it is impossible to carry out the steps of the method claims solely in the mind of a human being.

These and other features of the invention will be apparent from the following detailed description and the accompanying figures, in which:

DETAILED DESCRIPTION

Figure 1:
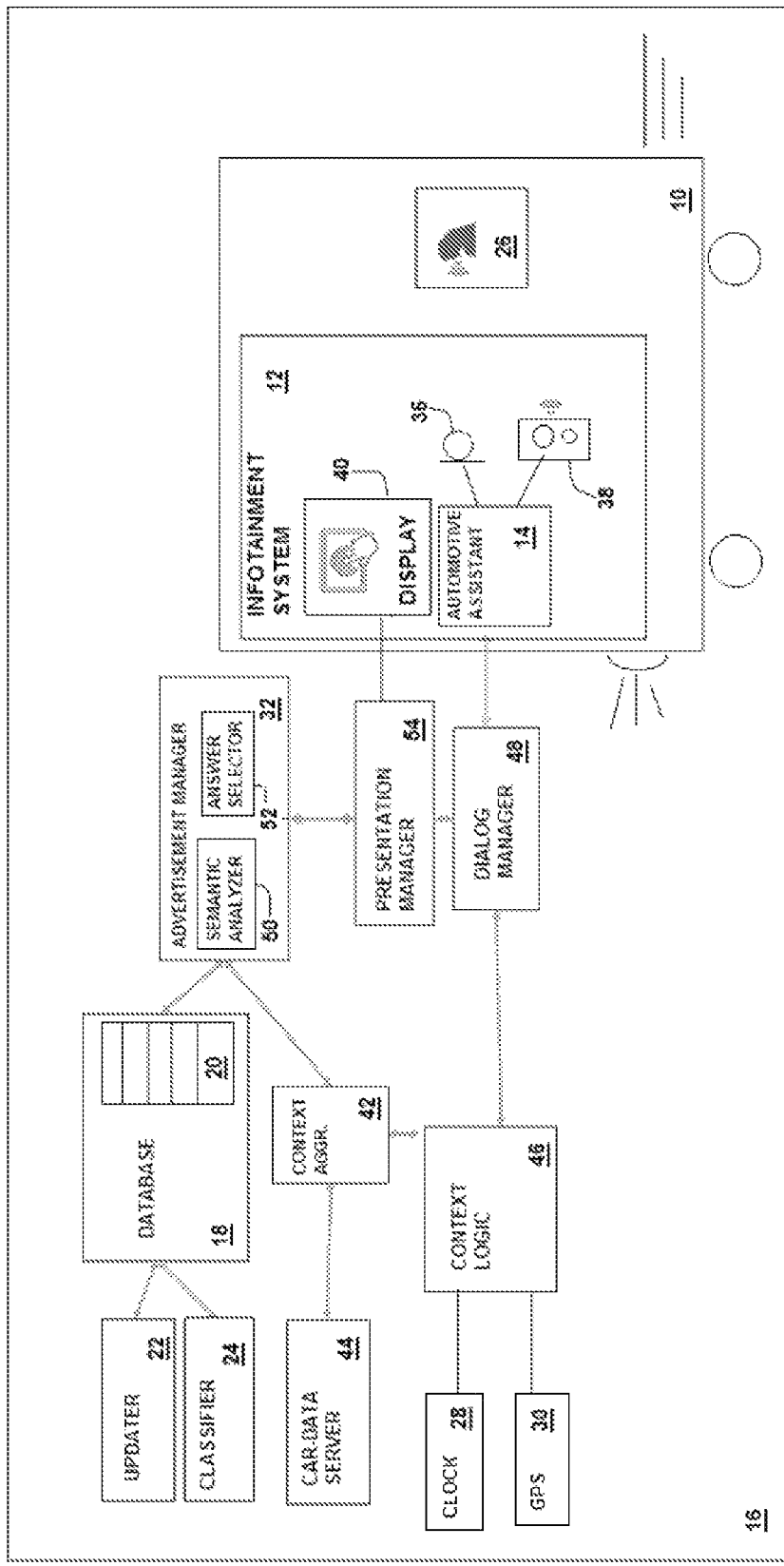
FIG. 1 shows details of the architecture of a geo-promotion system of FIG. 1.

FIG. 1 shows a vehicle 10 having an infotainment system 12 that executes an automotive assistant 14. The automotive assistant 14 interacts with a distributed geo-promotion system 16 that maintains a database 18 of advertisements 20. The geo-promotion system 16 selects an advertisement 20 from this database 18 and serves it to an occupant 26 in the vehicle 12. It does so based at least in part on information indicative of the vehicle's location and information indicative of a state of one or more occupants 26 within the vehicle 10.

In some cases, an advertisement 20 carries information concerning an opportunity to engage in a commercial transaction under conditions that are temporarily more favorable than normal. Such an advertisement 20 is often referred to as a "promotion." Examples would include a price decrease for a finite time, after which pricing rises to its original state. The time interval during which promotional pricing exists is referred to herein as the "promotion period." In some cases, a promotion is spatially bound. For example, a discount may only apply to fast-food outlets in a particular county. The region over which the promotional pricing exists is referred to herein as the "promotion region."

The notion of an "advertisement" is by no means limited to commercial announcements. In some cases, an advertisement 20 selected by the geo-promotion system 16 is a safety announcement, such as the availability of an improved airbag for the vehicle 10, together with information on where to have it installed. Such an advertisement 20 would be based on context information acquired by the geo-promotion system 16, such as information indicating that the vehicle's location is close to where such an airbag can conveniently be installed.

In some cases, an advertisement 20 carries information that would make a commercial transaction more convenient. For example, in some cases, the geo-promotion system 16 selects an advertisement 20 that includes information inviting an occupant 26 in the vehicle 10 to make a reservation at a facility such as a nearby parking lot, fuel station, restaurant, or other business establishment. In doing so, the geo-promotion system 16 relies on context information.

Examples of such context information upon which a geo-promotion system 16 relies include an observation that the vehicle's fuel level is low and that there exist ambient sounds having amplitudes and frequencies indicative of restive children. In such cases, the geo-promotion system 16 infers that the occupant 26 would welcome being served an advertisement 20 drawing attention to nearby refueling stations that also offer play facilities nearby. In this case, the geo-promotion system 16 relies on a vehicle state, i.e., a low fuel level, an occupant state, i.e., the presence of restive children, and on information indicative of location, to identify suitable refueling stations within the vehicle's range.

In another example, the geo-promotion system 16 recognizes that it is past the customary time at which the occupant 26 cats lunch, that the vehicle 10 has not stopped for some time, and that sounds having amplitudes and frequencies characteristic of mastication have not been detected for some time. From this, it is possible to infer that the occupant 26 has not stopped for some time and has also not eaten in the vehicle 10 for some time. This would provide a basis for the geo-promotion system 16 to infer that the occupant 26 would appreciate being served an advertisement 20 drawing attention to a nearby establishment at which to seek fortification. In this example, the geo-promotion system 16 relies environmental state, i.e., the time of day, occupant state, i.e., a lengthy interval since the last detection of sounds characteristic of food ingestion, vehicle state, i.e., continuous operation for an extended period, and of course, location, to identify a suitable establishment that is nearby.

Another example of an advertisement 20 that the geo-promotion system 16 can select would be information concerning a nearby park or green space that may be conductive to promotion of mental health. An example of context information relied upon by the geo-promotion system 16 for such a choice would be an observation of delayed reaction time or failure to use turn signals that the occupant customarily uses. The selection of an advertisement 20 in this case relies on location information, since the park must be nearby, and on occupant state, namely the high probability of Such an observation indicates the occupant state of having a high probability of mental fatigue.

Another example of an advertisement 20 that the geo-promotion system 16 can select would be information offering to re-route a navigation path so that the vehicle comes close to a point-of-interest. Whether or not a point is one of interest would be based on, among other things, occupant state.

The passage of time causes turnover in the database 18. New promotions arise and old promotions expire. An updater 22 and a classifier 24, both of which are shown in FIG. 1 as being in data communication with database 18, ensure that the database 18 remains current.

The updater 22 regularly adds new advertisements 20 to the promotion database 18 as they become available. The updater 22 specifies the promotion period and the promotion region, the promotion's substance, and in some cases, a promotion code to be provided by those who wish to take advantage of the promotion. As a result of the updater's activity, the content of the promotion database 18 is continuously in flux.

The classifier 24 tags each advertisement 20. Doing so makes it simpler for the geo-promotion system 16 to find advertisements 20 that that are likely to be of interest to an occupant 26 of the vehicle 10. Particularly useful tags are those that associate a category with the advertisement 20 and those that associate a spatial extent or a temporal extent with that advertisement 20.

As a vehicle 10 transports its occupant 26, it traverses a path. For each point on this path, it is possible to use the promotion region and the promotion period to identify those promotions that are feasible for an occupant 26 at that point to exploit. Promotions that are feasible are said to belong to a "feasible set" of promotions.

An occupant's ability to take advantage of promotions is hampered by the occupant's inability to identify all promotions that are in the feasible set of promotions. The fact that the membership of the feasible set changes as the vehicle 10 moves through space further complicates the task. As a result, an occupant 26 who wishes to engage in commercial activity may not know the variety of promotions that are available in that region.

To alleviate this difficulty, the automotive assistant 14 interacts with the geo-promotion system 16 to estimate a promotion's interest quotient. A promotion's interest quotient provides an estimate of the probability that the occupant 26 will take advantage of the promotion. The geo-promotion system 16 attempts to draw the occupant's attention to only those promotions with a suitably high interest quotient. In order to do so, the geo-promotion system 16 estimates the interest quotient based on time, location, and context.

Time and location are easily acquired from a clock 28 and a GPS 30 on board the vehicle. The GPS 30 provides location information to the geo-automotive assistant 18. The clock 28 provides temporal information to the geo-automotive assistant 18. The automotive assistant 18 provides the location information and the temporal information to the geo-promotion system 16. The location information and temporal information is often sufficient to determine whether an advertisement 20 belongs in the feasible set.

An advertisement manager 32 in data communication with the database 18 chooses advertisements 20 that are within the feasible set. It does so based on the foregoing location information and temporal information.

To reduce the number of promotions, it is useful to evaluate which advertisements 20 in the feasible set are likely to be of interest to an occupant 26. The advertisement manager 32 carries out such evaluation by receiving both information indicative of a vehicle's location and information indicative of the state of one or more occupants of the vehicle, the latter being referred to herein as the "occupant state." These provide useful context.

A speech interface 34 that executes on the infotainment system 12 assists in acquiring information indicative of occupant state. The speech interface 34 enables the automotive assistant 14 to engage the occupant 26 in two-way speech communication using a microphone 36 and a loudspeaker 38. A display 40 permits the automotive assistant 14 to display information pertinent to a particular advertisement 20.

The range of context used by the advertisement manager 32 further includes an occupant's configured preferences as well as preferences that the automotive assistant 14 learns over the course of being used. Also included within the range of context is a calendar, from which the automotive assistant is able to identify appointments and obligations whose existence may be pertinent to the choice of promotions.

In some cases, it is useful to have available, for use as context, information indicative of vehicle state. Some of this information is available through a car-area-network bus. Examples of vehicle state, as opposed to occupant state, include various climate control settings, the state of lights, settings of seat controls, and states of the various windows, as well as states that have been set using the vehicle's command and control features. For example, if a vehicle's fuel supply is running low, it may be useful to select an advertisement 20 concerning a nearby discount gas station.

In addition to the information about the vehicle's state, it is also useful to have information concerning the vehicle's location and velocity. These are available from a GPS system. Such information provides information on proximity to various points of interest, provided, for example, by a remote database of points-of-interest.

Location information is separate from vehicle state because location depends on coordinate system and is therefore not a property of the vehicle per se. Indeed, a vehicle is technically in an infinite number of locations at the same time because there are an infinite number of possible coordinate systems.

Additional information that is usable for context includes state of the vehicle's environment, such as time-of-day and weather conditions, both of which are available from sources outside the vehicle, range information, as inferred from readings of a potential-energy-source meter, examples of which are a fuel-gauge or a measure of battery capacity. Further examples include the presence of nearby population centers or other loci of commercial activity, e.g., malls, weather conditions, and road conditions, and real-time traffic information. These are all potentially useful for estimating a promotion's interest quotient.

Other examples of information that is available for use by the advertisement manager 32 as context in selecting an advertisement 20 include the state of a vehicle's advanced driver assistance systems. As an example, information indicating that an advanced driver assistance system has detected the occupant state of driver drowsiness may cause retrieval of a promotional advertisement 20 concerning a discount at a nearby motel followed by an announcement from the automotive assistant 14 drawing attention to a nearby hotel for spending the night. The determination of what hotels are nearby relies on information indicative of location.

Also available for use as context by the advertisement manager 32 is historical information. Examples include driving patterns and navigation history, which would include time stamps to indicate where the vehicle 10 was located at various times.

Other information that is useful for context derived from occupant state includes media content, either acquired via radio broadcast or by media supplied by the vehicle occupant. For example, an occupant 26 who has been listening to stand-up comedy over the course of a week coupled with information concerning location may result in selection of a promotion drawing attention to a nearby comedy club that the occupant 26 would never have otherwise known about.

Still other examples of context derived from occupant state include information acquired from the vehicle's cabin. Such information includes the number of occupants 26 and relevant demographic information, such as age and gender, and inferences concerning the states of the occupants 26. Examples of states include physical states, cognitive states, and emotional states.

Other information that is both useful as context and available from the vehicle's cabin is information concerning speech events and information concerning non-speech events. The latter includes information concerning the direction in which one or more occupants 26 gazes and information concerning gestures made by one or more occupants 26. The former includes speech acquired as a result of interaction with the speech interface a speech interface 34 as well as speech acquired as a result of passive listening through the microphone 36.

A context aggregator 42 relies on information about the vehicle state, occupant state, and environment state. It then uses the resulting aggregate of information to extract context that is potentially useful to evaluate a promotion's interest quotient.

Many modern vehicles 10 include sensors that transmit operational data of the type described above to a car-data server 44 in the cloud. The information provided by these sensors is rich in context. Accordingly, it is useful for the context aggregator 42 to regularly receive such operational data.

The context aggregator 42 also receives context from context logic 46. The context available from the context logic 46 arises from sources within the vehicle 10.

The context logic 46 includes circuitry that identifies a subset of context received from the vehicle 10 or from occupants of the vehicle 10. These represent vehicle state and occupant state respectively. Such context is expected to be useful for assisting the advertisement manager 32 in selecting suitable advertisements 20.

Context information available to the context logic 46 includes context from observation of activity within the vehicle's cabin and sensor outputs from critical car sensors, such as the fuel gauge, tire pressure readings, etc., the vehicle's location. In some embodiments, the context logic 46 also relies on historical analytics, such as preferences, previous choices made by one or more occupants 26 of the vehicle, or other usage history.

One fruitful source of context is speech within the vehicle 10. As a result, it is useful for a dialog manager 48 that is in communication with the automotive assistant 14 to receive and interpret an utterance and to provide the interpreted utterance to the context logic 46 for analysis thereof.

Upon having analyzed available context, the context logic 46 determines whether ongoing conversation is taking place. Doing so avoids interrupting an ongoing conversation with an announcement of an advertisement 20. Upon having detected an absence of conversation, the context logic 46 transmits a signal to the context aggregator 42 to cause the advertisement manager 32 to select an advertisement 20.

In addition to being in data communication with the database 18, the advertisement manager 32 is also in data communication with the context aggregator 42. As a result, the advertisement manager 32 has access to context provided by the context aggregator 42 for use in narrowing down the feasible set that it identified in the database 18.

For analysis of context derived from speech, the advertisement manager 32 includes a semantic analyzer 50 and an answer selector 52. The semantic analyzer 50 analyzes a question posed by an occupant 26. The answer selector 52 relies on deep learning to formulate an answer that is consistent with the semantic analysis of that question.

When necessary, the advertisement manager 32 communicates with the context aggregator 42 to request additional context from the context logic 46. In response, the context logic 46 provides the requested additional context to the context aggregator 42, which then forwards it to the advertisement manager 32 for further processing in connection with providing one or more relevant advertisements 20.

After having acquired the necessary context, the advertisement manager 32 uses that context to identify one or more relevant advertisements 20 and to identify a suitable time at which to serve those advertisements 20 over the loudspeaker 38.

At the suitable time, the advertisement manager 32 sends the selected advertisement 20 to a presentation manager 54. Based in part on the vehicle's state and/or occupant state, the presentation manager 54 determines how best to present the selected advertisement 20. Communication modes that are available to the presentation manager 52 include text, video, audio, or combinations thereof, with the mode being based on the nature of the advertisement 20 and on the vehicle's state.

The presentation manager 54 then communicates with the dialog manager 48. The dialog manager 48 then formulates a suitable announcement for delivery over the loudspeaker 38, the display 40, or a combination thereof.

Figure 2:
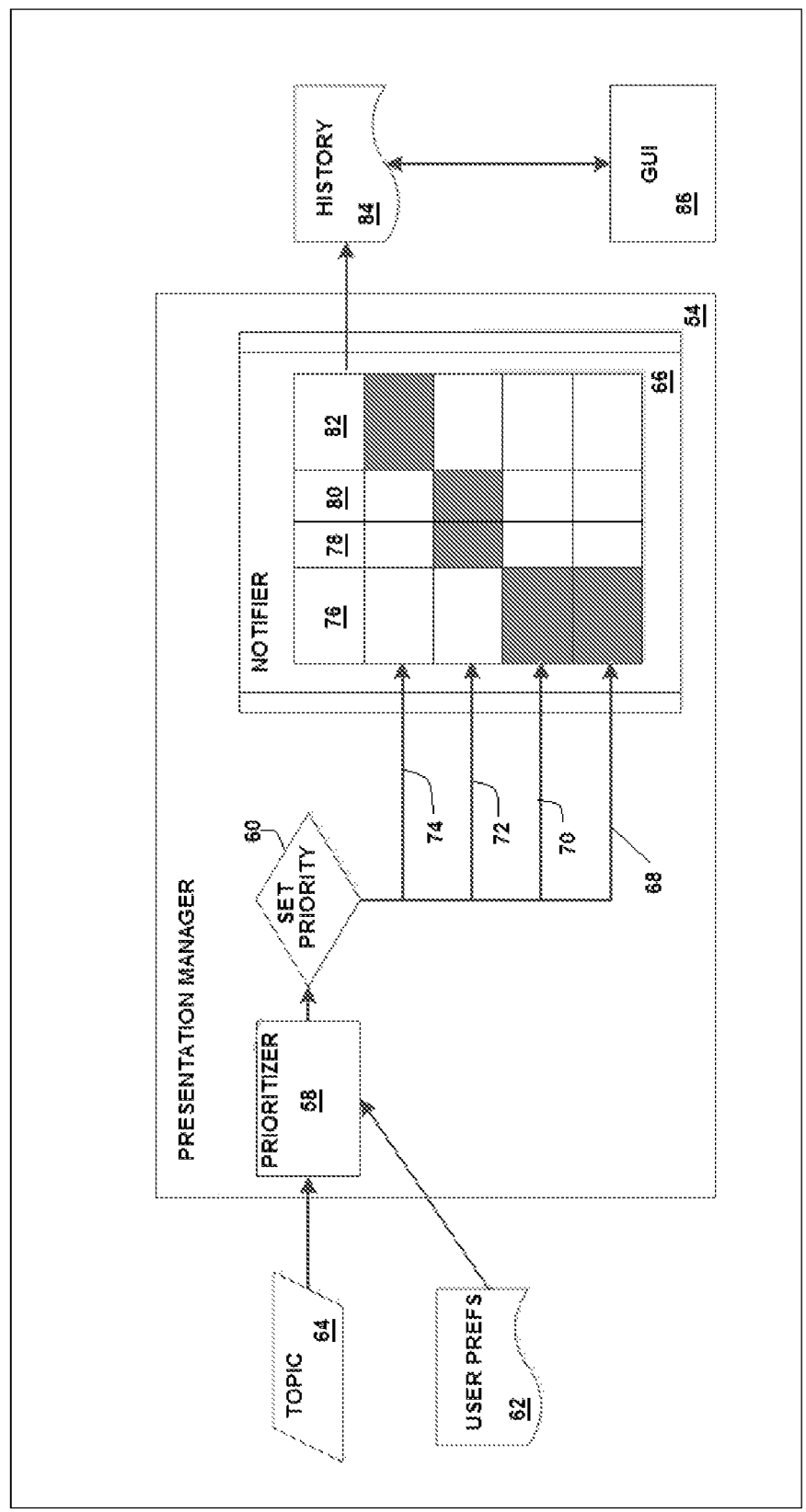
FIG. 2 shows details of the presentation manager of shown in FIG. 1.

As shown in FIG. 2, in some embodiments, the presentation manager 54 applies contextual prioritization 58 to set a priority 60 for a proposed announcement. It does so based in part on the occupant's preferences 62 and on the proposed announcement's topic 64. For example, an announcement topic 64 of a tornado's rapid approach may trump the occupant's preference 62 to not be interrupted while on a telephone call.

A notification module 66 controls how announcements are delivered. The illustrated notification module 66 operates on four priorities: urgent priority 68, high priority 70, medium priority 72, and low priority 74.

For announcements of the most urgent priority 68, the notification module 66 causes the dialog manager 48 to engage in actual dialog 76.

For announcements of high priority 70, the notification module 66 still causes the dialog manager 48 to engage in actual dialog 76 but with content having been selected to reduce cognitive load associated with that announcement. The reduced cognitive load results in imposition of a cognitive load on the occupant 26 that is less than that which would have been imposed had the notification module 66 instead used an urgent priority 68.

For announcements of only medium priority 72, the notification module 66 causes the dialog manager 48 to merely activate a subtle signal within the vehicle, such as one or both of an audio cue 78 and a visual cue 80. An example of an audio cue 78 is a soft beep over the loudspeaker 38. An example of a visual cue 80 is the appearance of an icon on the display 40 or the illumination of a light-emitting diode on the vehicle's instrument cluster or dashboard.

For announcements of low priority 74, the notification module 66 makes no real time announcement at all. Instead, the notification module 66 defers the announcement for inclusion in a daily report 82.

In some embodiments, the notification module 66 causes the occurrence of an announcement to be recorded in a history file 84 so that it can easily be recalled, for example through a graphical user-interface 86 provided to the occupant 26.

Thus far, the geo-promotion system 16 has been described as operating in reactive mode. When doing so, the geo-promotion system 16 responds to inquiries by an occupant 26. In some embodiments, the geo-promotion system 16 operates only in reactive mode. However, embodiments also include those in which the geo-promotion system 16 transitions between operating in reactive mode and operating in a "proactive" mode and those in which it only operates in the proactive mode.

In a geo-promotion system 16 that is operating in proactive mode, the dialog manager 48 monitors activity within the vehicle's cabin and provides context to the context logic 46 on a more or less continuous basis.

An example that illustrates the benefit of such continuous monitoring arises when the dialog manager 48 observes that the radio has just played an advertisement promoting a particular product. In such cases, the dialog manager 48 provides information indicative of this observation to the context logic 46. The context logic 46, assuming it deems the dialog manager's observation useful, causes the advertising manager 32 to retrieve advertisements 20 that are relevant to both the product that has just been promoted, to the vehicle's location, and to any other observations made within the vehicle. This aids the advertising manager 32 in choosing the most appropriate advertisement 20 for delivery via the presentation manager 54.

Figure 3:
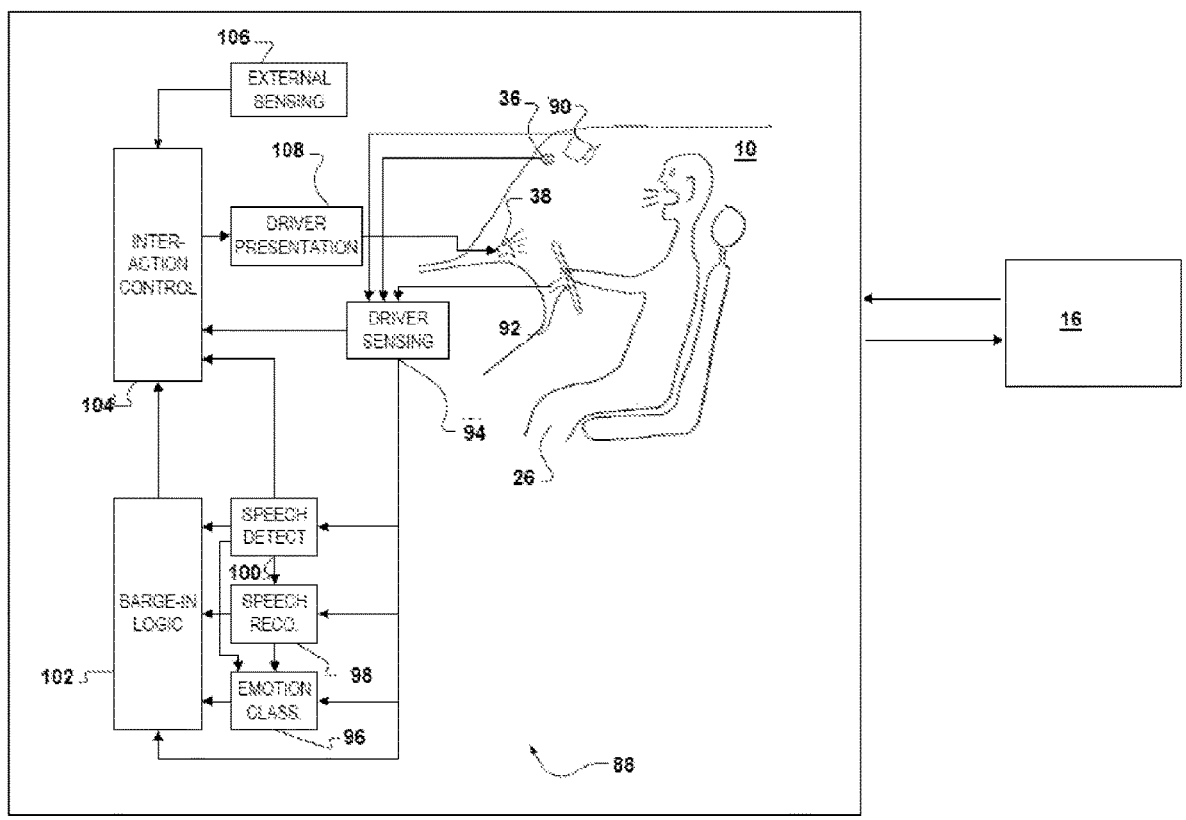
FIG. 3 shows a vehicle that interacts with the distributed geo-promotion system of FIG. 1.

FIG. 3 shows circuitry 88 that has been installed in a vehicle 10 that is being driven by the occupant 26. The circuitry 88 includes certain inputs that acquire information concerning the occupant 26. Examples of such inputs include a microphone 36, a camera 90, and a steering wheel 92, all of which connect to driver-sensing circuitry 94.

The driver-sensing circuitry 94 receives an audio signal from the microphone 36. This audio signal is then provided to an emotion-classifier 96, to speech-recognition circuitry 98, and to speech-detection circuitry 100. The speech-detection circuitry 10, the speech-recognition circuitry 98, and the speech-detection circuitry 100 all provide information to the emotion classifier 96.

Barge-in logic 102 collects information provided by the emotion-classifier 96, the speech-recognition circuitry 98, the speech-detection circuitry 100, and the driver-sensing circuitry 94. The barge-in logic 102 uses this information to determine whether it is necessary to communicate with the occupant 26 and if so, the nature of the information that is to be communicated. If the barge-in logic 102 determines that such communication is warranted, it transmits a signal to the interaction controller 104.

In addition to receiving information from the barge-in logic 102, the interaction controller 104 also receives information from the speech-detection circuitry 100, from the driver-sensing circuitry 94, and from external sensors 106. Based on this information, the interaction controller 104 provides a suitable communication to a driver-presentation module 108. The driver-presentation module 108 creates a speech utterance to be delivered via the loudspeaker 38.

It is to be understood that the foregoing description is intended to illustrate and not to limit the scope of the invention, which is defined by the scope of the appended claims. Other embodiments are within the scope of the following claims.

What is claimed is:

1. An apparatus comprising:
    a cloud-based vehicle-data server that wirelessly receives operational data from plural vehicles,
    circuitry in a vehicle, said circuitry comprising inputs that acquire information for use in prepared context information, said inputs comprising:
        a microphone,
        a camera,
        a clock,
        a GPS system, and
        a steering wheel,
        all of which connect to driver-sensing circuitry, said information being used for prepared context information,
    a car-area-network bus, wherein said car-area-network bus carries information indication of vehicle state for use in said prepared context information, and
    a display for displaying advertisements,
    a distributed geo-promotion system for selecting an advertisement that is to be served to an occupant in a vehicle that comprises an infotainment system, said vehicle being separate from said distributed geo-promotion system, wherein said distributed geo-promotion system comprises:
        storage hardware that stores a database of advertisements, said advertisements having been compiled from a source of advertisements,
        an advertisement manager that is in data communication with said database, said advertisement manager having been configured to use said prepared context information to select an advertisement from said database to be served to said occupant, said prepared context information comprising information indicative of location of said vehicle and information indicative of an occupant state of said occupant,
        context logic that receives said information indicative of said occupant state and said information indicative of said location and uses said information indicative of said occupant state and said information indicative of said location to generate prepared context information for use by said advertisement manager in selecting said advertisement, and
        a context aggregator in data communication with said context logic, with said advertisement manager, and with a vehicle-data server that collects sensor data obtained from sensors in said vehicle, wherein said context aggregator is configured to interrogate said vehicle-data server for said sensor data in response to a request from said context logic, to receive operational data from said vehicle-data server, to communicate both said operational data from said vehicle-data server to said advertisement manager, and to communicate context received from said context logic to said advertisement manager.

2. The apparatus of claim 1, wherein said prepared context information further comprises a velocity of said vehicle.

3. The apparatus of claim 1, wherein said vehicle is travelling to a destination and wherein prepared context information further comprises a time at which said vehicle is expected to arrive at said destination.

4. The apparatus of claim 1, wherein said database is in data communication with an updater and a classifier, wherein said updater adds new advertisements to said database as said new advertisements become available, wherein for each of said new advertisements, said updater specifies a promotion period, a promotion region, and a promotion code, wherein said classifier tags each advertisement with a tag, wherein said tags associate, with each of said advertisements, a spatial extent, a temporal extend, and a category.

5. The apparatus of claim 1, wherein said geo-promotion system is configured to interact with an automotive assistant executing in said infotainment system of said vehicle to estimate an promotion's interest quotient for an advertisement stored in said database, wherein said interest quotient provides an estimate of a probability that said occupant will respond to said advertisement, wherein said advertisement manager selects only advertisements that have an interest quotient in excess of a threshold, and wherein said interest quotient is based on time, said vehicle's location, and said prepared context information.

6. The apparatus of claim 1, wherein said geo-promotion system further comprises a dialog manager that is in data communication with a speech interface in said vehicle and with said context logic, wherein said information indicative of occupant state comprises information that originates from speech uttered by said occupant.

7. The apparatus of claim 1, wherein said advertisement manager comprises a semantic analyzer that carries out semantic analysis of said context to identify a question posed by said occupant and an answer selector that relies on deep learning to formulate an answer that is consistent with said semantic analysis.

8. The apparatus of claim 1, wherein said context logic is configured to receive information indicative of a vehicle state.

9. The apparatus of claim 1, wherein said context logic is configured to receive emotion data from an emotion classifier in said vehicle and wherein said information indicative of said occupant state is derived from said emotion data.

10. The apparatus of claim 1, wherein said context logic is configured to receive external data from an external sensor on said vehicle and wherein said prepared context information comprises information obtained from said external data.

11. The apparatus of claim 1, wherein said geo-promotion system further comprises a notification module that prioritizes said advertisement selected by said advertising manager and controls when and how to deliver of content from said advertisement to said occupant.

12. The apparatus of claim 1, wherein said geo-promotion system further comprises a notification module that prioritizes said advertisement selected by said advertising manager and delivers content from said advertisement using a mode whose intrusiveness depends on said priority, wherein said modes comprise a speech announcement for urgent priority, a visual cue for a less urgent priority.

13. The apparatus of claim 1, wherein said geo-promotion system further comprises a notification module that prioritizes said advertisement selected by said advertising manager based on stored user preferences of said user and a topic of inquiry by said user.

* * * * *